Figure 1:
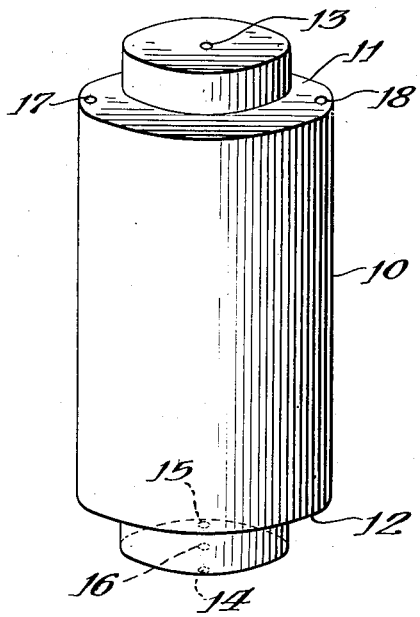

Jan. 20, 1953 L. S. KASSEL 2,626,204
APPARATUS FOR CONDUCTING CATALYTIC ENDOTHERMIC
AND EXOTHERMIC REACTIONS
Filed Jan. 29, 1949 2 SHEETS—SHEET 1

Inventor:
Louis S. Kassel
By M. P. Venema
Attorney
Robert J. Newman
Agent

Jan. 20, 1953   L. S. KASSEL   2,626,204
APPARATUS FOR CONDUCTING CATALYTIC ENDOTHERMIC
AND EXOTHERMIC REACTIONS
Filed Jan. 29, 1949                                         2 SHEETS—SHEET 2
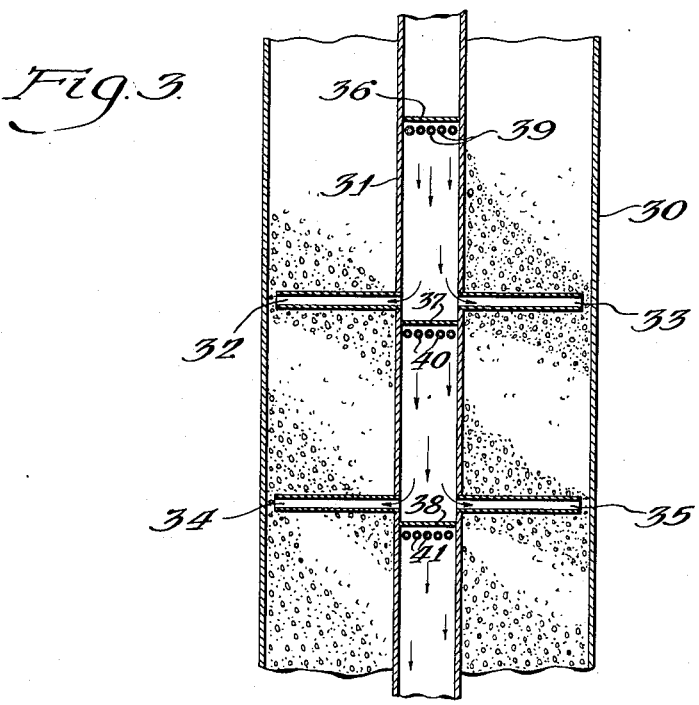
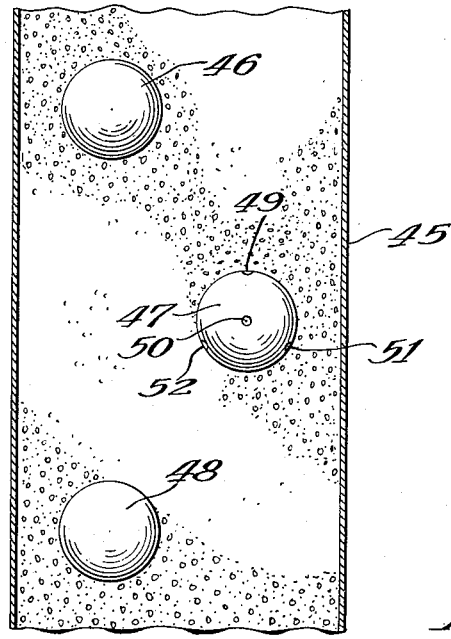
Inventor:
Louis S. Kassel
By M. P. Venema
   Attorney
Robert J. Newman
   Agent Patented Jan. 20, 1953

2,626,204

UNITED STATES PATENT OFFICE 2,626,204

APPARATUS FOR CONDUCTING CATALYTIC ENDOTHERMIC AND EXOTHERMIC REACTIONS

Louis S. Kassel, Riverside, Ill., assignor to Universal Oil Products Company, Chicago, Ill., a corporation of Delaware Application January 29, 1949, Serial No. 73,633

3 Claims. (Cl. 23—288)

This invention relates to a novel method of conducting endothermic and exothermic reactions and to beds of granular solids having flow diverting means incorporated therein.

Reactions involving an appreciable heat of reaction frequently are conducted in reactors comprising a number of tubes arranged for parallel flow with provision for external cooling or heating, depending upon whether the reaction is exothermic or endothermic. In the case of reactions carried out in the presence of fixed beds of granular solids disposed in such reaction tubes, there are substantial radial gradients both in temperature and in concentrations of reactants and products. These gradients may be decreased and more nearly homogeneous and isothermal conditions achieved by using a larger number of smaller diameter tubes in place of the larger tubes. This expedient, however, is costly and introduces additional engineering and operational problems. A much larger number of tubes of the same length must be employed to obtain the same reaction volume, and the increased number of headers and end closures provides greater opportunity for leakage as well as more numerous expansion and contraction problems. For these reasons, it is highly desirable that means be provided for decreasing the radial gradients in order that the larger diameter tubes may be used efficiently.

It is, therefore, a principal object of my invention to provide externally heated or cooled beds of granular solids provided with means for decreasing transverse gradients as a reactant is passed therethrough.

Another important object of the present invention is to provide novel methods for more efficiently converting a reactant by means of a reaction involving an appreciable net heat of reaction and accomplished by passing a reactant through a bed of solid catalyst particles, there being a flow of heat in said bed transverse to the main direction of flow of the reactant.

In one embodiment my invention comprises a bed of granular particles disposed in indirect heat exchange relation with a heat transfer medium outside said bed, the latter containing disposed therein flow diverting means arranged to induce a part of the reactant passing through said bed to flow transversely to the principal direction of flow.

In another embodiment my invention relates to a process which comprises passing a reactant at conversion conditions of time, temperature, and pressure through a tube in heat exchange relation with a heat transfer medium and containing solid catalyst particles in the form of a bed, said bed containing conduits arranged to induce a portion of the reactant to flow transversely to the principal direction of flow through the bed.

In a more specific embodiment my invention relates to a process which comprises passing at conversion conditions of time, temperature, and pressure, a substantially olefin-free hydrocarbon reactant containing naphthenes and boiling below about 425° F. through a substantially vertical bed of catalyst that promotes the endothermic conversion thereof, said bed containing tubular means for inducing lateral flow of a portion of the reactant and being in radiative relation to a source of radiant heat, absorbing sufficient heat from said source to supply at least a portion of the endothermic heat of reaction, and recovering the products of the reaction.

In its broad aspect, my invention relates to the use of any internal structure or device which will divert at least a part of the flow of reactant and products from the central region of the tube to the peripheral region and/or from the peripheral region to the central region. Stated another way, the internal structure or device is designed to induce a part of the reactant and products of conversion to pass transversely or laterally to the principal direction of flow. By this, I do not mean that the transverse or lateral flow must necessarily be at right angles to the principal direction of flow; it is sufficient if it is merely oblique thereto. This diversion or deflection may take place either continuously along the length of the tube or at spaced intervals. One method of achieving a continuous diversion is to attach a spiral band to the inner surface of the tube. Diversion at spaced apart points may be accomplished by the use of a disk and doughnut construction or by the use of cone elements in the catalyst bed. Upright cones in a vertical tube will cause all of the fluid to periodically pass next to the tube wall whereas hollow inverted cones with an opening at the apex will cause all of the fluid to pass through the central region. Although these methods reduce radial gradients, they bring about a substantial increase in pressure drop through the tube. I have found that such pressure drops can be avoided and any reasonable center-to-wall or wall-to-center exchange obtained by incorporating diverter elements into the bed. Diverter elements are devices which provide unpacked channels between two or more points in the bed, at different lateral and longitudinal positions.

A reaction zone which does not manifest an increased pressure drop comprises a length of tube divided into a number of separate zones containing the granular solid, said zones being separated by solid-free regions containing the flow diverting means. A suitable design for such means is shown in Figure 1. A cylindrical plug 10 which fits closely within the reaction tube has annular grooves 11 and 12 at each end thereof. Diagonal holes are drilled in the plug from 13 to 14 and from 13 to 15. A second non-intersecting set of holes is drilled from 16 to 17 and from 16 to 18. If the plug is placed in a vertical tube with the end containing hole 13 above the other end, and if the reactant is passing through the tube in a downwardly direction, the material passing through the center of the tube will enter 13 and exit through 14 and 15 next to the inner surface of the tube. The material flowing near the inner surface of the tube will enter holes 17 and 18 and exit through hole 16 at the center of the tube. In this manner a substantially complete center-to-wall and a wall-to-center exchange of reactant and conversion products is effected by means of a single diverter element. By proper sizing of the passages through diverter element 10, the pressure drop therethrough can be made as small as desired. Since the channels are unpacked small pressure drops can be achieved even though the cross sectional area of the passage ways are relatively small.

Figure 2:
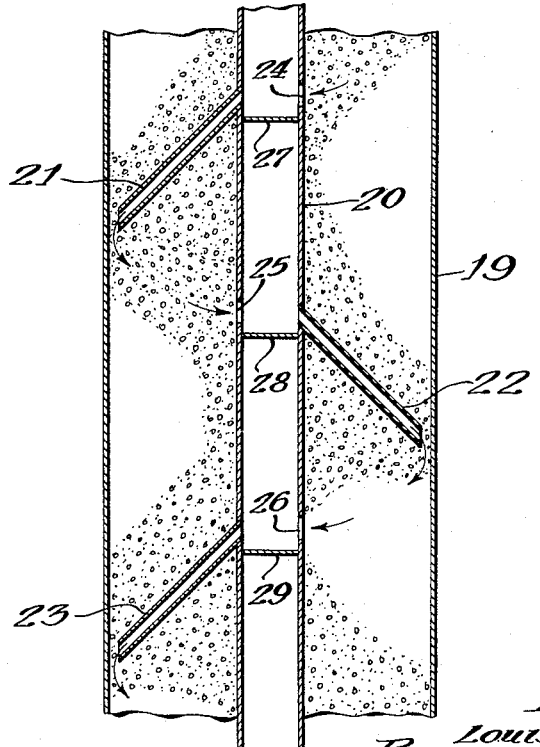

A particularly advantageous method of effecting mass interchange is shown in Figure 2. In this figure, 19 is a portion of the reaction tube, 20 is a diverter tube, 21, 22, and 23 are tubular fingers extending downwardly from 20 and terminating near the wall of tube 19. Numerals 24, 25, and 26 refer to perforated sections of diverter tube 20, and 27, 28, and 29 are closures in said diverter tube. The diverter assembly will be inserted into the reaction tube and a granular solid poured into tube 19 but not into tube 20. If the reactants flow in a downwardly direction, solids will not enter the tubular fingers. Since the pressure drop through the unpacked diverter tube assembly is smaller than the pressure drop through an equivalent length of catalyst bed, there will be a flow of reactants through perforated sections 24, 25, and 26, and through associated finger tubes 21, 22, and 23, thereby diverting a portion of the flow from central to peripheral regions. If the reaction tube is mounted in a radiantly heated furnace and receives non-uniform heating around its circumference, a corrective asymmetry may be introduced into the diverter tube. This may be done by shifting the axis of the tube toward the colder wall and/or by pointing a larger number of fingers toward the hotter wall.

Somewhat similar diverter means is shown in Figure 3. In this figure, 30 is a portion of the reactor tube, 31 is the diverter tube and 32, 33, 34, and 35, are finger tubes extending horizontally from 31 and terminating close to the inner surface of reaction tube 30. The diverter tube contains closures 36, 37, and 38 as well as openings 39, 40, and 41. In operation, the downwardly flowing reactant and conversion products will enter the diverter tube 31 through hole 39, for example, and will leave through tubes 32 and 33, thus effecting a transfer of material from the center region of the solids bed to the outer regions. If the flow is passed upwardly through the bed, the reactant and conversion products will enter the finger tubes near the outer edge of the catalyst bed and will exit from diverter tube 31 through the openings near the center of the bed.

A particularly simple form of diverter element comprises a length of plain tubing, with ends which will not admit catalyst or other granular solids. If I am using catalyst tubes of 4" internal diameter, and if the active component of my catalyst is in the form of $\frac{3}{16}$" pills, then my diverter elements might be tubes of $\frac{1}{8}$" to $\frac{3}{16}$" internal diameter, 2" long, and with the ends flattened in cross section so that they cannot be plugged by a single pill. When a mixture of catalyst and diverter elements of this character is poured rapidly into a catalyst tube, the diverter elements will assume random orientations. The elements which are substantially vertical or substantially horizontal will serve no purpose, but the majority, which assume a diagonal position, will produce radial conductivity. When such a mixture is poured slowly, however, the majority of the tubes will assume substantially horizontal positions. Since slower pouring generally is more desirable in order to achieve more uniform packing of the granular material, these simple elements are not as satisfactory as the elements that are next described. The preferred forms of diverting elements of this type comprise four interconnected non-planar points. They may be made from a tubular cross by bending the arms to the corners of a tetrahedron. Alternatively they may be made by drilling holes or cutting slits or slots in a hollow sphere as shown in Figure 4. A reaction tube 45 contains a bed of granular catalyst having hollow spheres such as 46, 47, and 48 disposed therein. A preferred form of the hollow sphere contains 4 openings, 49, 50, 51 and 52, in the surface thereof at the 4 corners of a tetrahedron. If the openings are located at these points, there will always be at least one opening that is not on the same horizontal plane as the other openings, and thus flow of reactant and products through this sphere, said flow having a transverse or lateral component, will be induced regardless of the manner in which this sphere orients itself. In order that each of the spheres be effective, it is necessary that they contain at least 4 openings, at least one of which is not in the same plane as the others. If there are only 3 openings, said openings define a plane, and if this plane is horizontal or vertical, there will be no lateral or transverse flow induced.

My invention can be used to advantage with both endothermic and exothermic organic and inorganic reactions. Examples of endothermic reactions in which my process and my granular solids beds, particularly granular catalyst beds, containing diverter elements may be employed, include the reforming of straight-run gasolines and naphthas, the dehydrogenation of cycloparaffins to aromatic hydrocarbons, the dehydrogenation of paraffins to olefins, the dehydrogenation of olefins to dienes, the conversion of isopropyl alcohol to acetone, the reaction between carbon dioxide and carbon, the reaction between steam and carbon, and the production of hydrogen iodide by the interaction of hydrogen with iodine. Exothermic reactions in which my invention may be applied to advantage include the synthesis of ammonia, the synthesis of hydrocarbons and oxygenated hydrocarbons by the reaction between hydrogen and carbon monoxide, the hydrogenation of organic compounds such as olefins and aromatic hydrocarbons, the oxidation of hydrocarbons and various other organic compounds, the polymerization of olefins, the alkylation of paraffins with olefins or of aromatics with olefins, and the reaction of methyl chloride with silicon in the presence of a copper catalyst to yield chloromethylsilanes. If the reaction is endothermic, the reaction tube will be surrounded by or exposed to a source of heat such as a radiant flame and the resulting hot products of combustion, super heated steam, hot liquids or vapors of various types, and condensing vapors such as condensing mercury vapors. If the reaction is exothermic, the reaction zone will be surrounded by or exposed to a heat absorbing medium such as water, various gases, vaporizable materials and the like.

My invention may be employed with highly beneficial results in the fixed catalyst bed endothermic conversion of hydrocarbons such as the dehydrogenation of cycloparaffins to aromatics, the cyclization of paraffins such as normal heptane to the corresponding aromatic, and the endothermic reforming of straight-run gasolines and naphthas. In such processes, high heat input rates are needed in order to offset the high degree of endothermicity of the reaction, particularly during the initial stages thereof. It has been found that these high heat input rates can be more conveniently and economically achieved by means of radiant heating. One such method of heating comprises placing the catalyst in a plurality of tubes arranged vertically around the inner periphery of the walls of a substantially cylindrical vertical heating chamber and subjecting said tubes to radiant heat from a radiant flame and the resulting hot products of combustion directed in a central longitudinal path through said chamber, while passing the charging stock through said tubes. Again, the vertical catalyst-containing tubes may be arranged in a row and flanked by parallel radiant walls, one or both of which is heated by a flame and the resulting hot products of combustion. It has been found that the radial temperature gradients when reforming a straight-run gasoline at about 900° F. in a 5" internal diameter radiantly heated reaction tube containing a catalyst comprising platinum and alumina, are of the order of 150–200° F. from the center of the tube to the wall of the tube. The result has been that the catalyst in the different parts of the bed becomes carbonized and deactivated at different rates and the efficiency of the process is substantially decreased because the reaction cannot be carried out at relatively constant temperature close to the optimum. I have found that by providing the 5" tube in such a process with sufficient redistribution means for effecting center-to-wall exchange of about 25% per foot of tube length, the radial temperature gradients are reduced to acceptable values with concomitant increases in reaction efficiency and overall catalyst life.

My invention can be used to great advantage in the reforming of hydrocarbons. The hydrocarbon stocks that may be converted in accordance with my process comprise nonolefinic hydrocarbon fractions containing saturated hydrocarbons, particularly naphthenes. By the term nonolefinic I mean substantially olefin-free, i. e., a few per cent of olefins can be present in the charge of some types of operation. Suitable stocks include narrow boiling fractions rich in naphthenes as well as substantially pure naphthenes such as cyclohexane and methylcyclohexane. Preferred stocks are those consisting essentially of naphthenes and paraffins, although relatively minor amounts of aromatics also may be present. The naphthenes are dehydrogenated to aromatics and the paraffins are hydrocracked to lower boiling paraffins. This preferred class includes straight-run gasolines, natural gasolines, and the like. The gasoline may be a full boiling point within the range of from about 50° to about 100° F. and an end boiling point within the range of from about 325° to about 425° F., or it may be a selected fraction thereof which usually will be a higher boiling fraction commonly referred to as naphtha, and generally having an initial boiling point of from about 125° to about 250° F. and an end boiling point within the range of about 350° F. to about 425° F. The expression "straight-run gasoline fraction" as used herein is intended to include both naphthas and full boiling gasolines.

The catalysts comprising platinum and alumina that are preferred for use in my hydrocarbon reforming process may contain substantial amounts of platinum, but, for economic as well as for product yield and quality reasons, the platinum content usually will be within the range of from about 0.05% to about 5.0%. A particularly effective catalyst of this type contains relatively minor amounts, usually less than about 3% on a dry alumina basis, of a halogen, especially chlorine or fluorine. One method of preparing the catalyst comprises adding a suitable alkaline reagent such as ammonium hydroxide or carbonate to a salt of aluminum, such as aluminum chloride, aluminum sulfate, aluminum nitrate, and the like, in an amount sufficient to form aluminum hydroxides, which upon drying, can be converted to alumina. The halogen may be added to the resultant slurry in the form of an acid such as hydrogen fluoride or hydrogen chloride, or as a volatile salt such as ammonium fluoride or ammonium chloride. The amount of combined halogen in the finished catalyst usually is maintained within the range of from about 0.1% to about 8% by weight of the alumina on a dry basis. The fluoride ion appears to be somewhat more active than other members of the halide group and, therefore, may be present in a lower concentration, within the range of from about 0.1% to about 3% by weight of the alumina on a dry basis. The amount of chloride ion incorporated into the catalyst composite will be within the range of from about 0.2% to 8%, preferably from about 0.5% to about 5% by weight of the alumina on a dry basis.

The use of the term "catalyst comprising platinum and alumina" in the specification and appended claims is intended to include platinum-alumina composites of the type described above including those containing minor amounts of a halogen. The exact manner in which the halogen or halide ion is present in the catalyst is not known although it is believed to be present in the form of a chemical combination or loose complex with the alumina and/or platinum components. Because the exact chemical constitution of such halogen-containing catalysts is not known, I sometimes refer to them as "catalysts comprising platinum, alumina, and a halogen." It is known, however, that the presence of a small amount of a halogen in the catalyst enhances the hydrocracking activity thereof; for platinum-alumina composites that are substantially halogen-free possess very little ability to promote hydrocracking.

Other platinum-containing catalysts that may be used in my process, although not necessarily with equivalent results, include platinum on charcoal, platinum on silica, platinum on asbestos, and platinum on bases or carriers that possess cracking activity such as silica-alumina composites. The corresponding palladium catalysts occasionally may be used with advantage in my process.

Hydrocarbon reforming operations carried out in accordance with my process in the presence of catalysts comprising platinum and alumina ordinarily will be conducted at temperatures of from about 750° F. to about 1000° F. At temperatures in the vicinity of 750° F. and lower, the aromatic-naphthene equilibrium is unfavorable, the reaction rates are quite low, and very low space velocities must be employed to obtain appreciable conversion. At temperatures in excess of about 1000° F. an appreciable amount of thermal reaction takes place accompanied by a poorer liquid recovery and more rapid catalyst deactivation.

The pressure at which my process will be conducted when employing platinum-alumina catalyst for the reforming of hydrocarbons usually will be within the range of from about 50 to about 1200 pounds per square inch; a weight hourly space velocity, which is defined as the weight of hydrocarbon charge per hour per weight of catalyst in the reaction zone, within the range of from about 0.2 to about 40; and the amount of hydrogen charged along with the hydrocarbons usually will be from about 0.5 to about 15 mols per mol of hydrocarbon, although the use of hydrogen is not absolutely essential.

From the foregoing it can be seen that I have provided novel granular solids beds having flow redistributing means incorporated therein. I also have described novel, relatively simple, and inexpensive processes for conducting endothermic and exothermic reactions.

I claim as my invention:

1. Apparatus for carrying out catalytic reactions which comprises a substantially vertical tubular catalyst container, a smaller tube concentrically disposed within the container along the axis thereof, said inner tube being divided into a plurality of separate compartments by a series of impervious partitions which extend across the entire cross sectional area of the tube at spaced intervals, each compartment of said inner tube having at least one opening adjacent one end of said compartment which is in direct and open communication with the area immediately surrounding said inner tube, and each compartment of said inner tube further having at the opposite end thereof at least one radially disposed hollow element extending outwardly toward the catalyst container wall, said hollow element providing an open passageway between the interior of the compartment and a point adjacent the wall of the catalyst container.

2. Apparatus for carrying out catalytic reactions which comprises an elongated tubular catalyst container, a smaller tube disposed within and extending lengthwise of the container and spaced from the container wall, said inner tube being divided into a plurality of separate compartments by a series of imperforate partitions which extend across the entire cross sectional area of the tube at spaced intervals, each compartment of said inner tube having at least one opening establishing direct and open communication between said compartment and the area immediately surrounding said inner tube, and each compartment of said inner tube further having at least one radially disposed hollow element extending outwardly toward the catalyst container wall, said hollow element providing an open passageway between the interior of the compartment and a point adjacent the wall of the catalyst container.

3. An apparatus of the class described comprising a heat exchange tube, a bed of solid particles in said tube, and a plurality of flow diverter elements within said bed, each of said elements comprising a hollow sphere having four openings in the surface thereof at the corners of a tetrahedron.

LOUIS S. KASSEL.

REFERENCES CITED

The following references are of record in the file of this patent:

UNITED STATES PATENTS

| Number | Name | Date |
|---|---|---|
| 1,386,768 | Day | Aug. 9, 1921 |
| 1,779,829 | Seigle | Oct. 28, 1930 |
| 1,831,185 | Mercier | Nov. 10, 1931 |
| 1,945,811 | Jaegar | Feb. 6, 1934 |
| 2,150,930 | Lassait | Mar. 21, 1939 |
| 2,170,437 | Voorhies | Aug. 22, 1939 |
| 2,317,379 | Hemminger | Apr. 27, 1943 |
| 2,376,365 | Lassiat | May 22, 1945 |
| 2,387,026 | Huntington | Oct. 16, 1945 |
| 2,461,331 | Lesseman | Feb. 8, 1949 |
| 2,479,110 | Haensel | Aug. 16, 1949 |

OTHER REFERENCES

Catalytic Reforming of Straightrun Gasoline Increases Aromatic Content, by V. I. Komarewsky et al., Oil and Gas Journal, June 24, 1943, pages 90–93 and 119.